United States Patent Office 2,853,393
Patented Sept. 23, 1958

2,853,393

HIGH-INDEX GLASS ELEMENTS

Warren R. Beck, Mahtomedi, and Nelson W. Taylor, Afton Township, Washington County, Minn., assignors to Minnesota Mining & Manufacturing Company, St. Paul, Minn., a corporation of Delaware No Drawing. Application October 12, 1951
Serial No. 251,128

18 Claims. (Cl. 106—47)

This application is a continuation-in-part of our copending application Ser. No. 56,055, filed October 22, 1948 (now abandoned).

This invention relates to our discovery of transparent high-index glass elements which are novel as to composition and which have extraordinarily high refractive index ($n_D$) values (at least 2.1). We have succeeded in making useful, transparent glass elements having refractive indices as high as, and higher than, that of diamonds (i. e., higher than 2.4), including elements having refractive indices of 2.6 to 2.7, which we believe to be without precedent. Our glasses have very high optical dispersion values. These glasses are in general stable to sunlight and to exposure to humid atmospheres and are not damaged by immersion in water.

Our glasses lie outside the field of optical glasses as ordinarily conceived. The manufacture of lenses, prisms and other glass elements of optical instruments generally requires the making of glass blanks of substantial size and thickness. The necessary pieces of solid glass must be formed from molten glass without devitrification taking place during the cooling of the glass. The larger the piece of glass, the slower the cooling that is required to avoid excessive mechanical strains. The slower the cooling, the greater the tendency to devitrify. Hence glass formulations must be employed which will not result in devitrification in making the sizable pieces of glass that are to be finished in manufacturing the final optical elements, such as lenses and prisms.

Our glass compositions are of such a nature that they cannot be employed in making optical elements of the usual sizes and shapes. They have a strong devitrification tendency. We have discovered, however, that they can be employed in making commercially useful elements provided these elements have a thickness not exceeding approximately two millimeters. These elements are sufficiently thin to permit of rapid cooling or quenching of the hot glass so that they can be brought to room temperature without devitrifying.

Examples of glass elements with which we are concerned are glass beads, fibers, flakes and thin plates.

We have provided low-melting glass compositions that melt to a very free-flowing state. This is of great importance in the manufacture of glass beads since the molten particles of glass form themselves into spheres due to the surface tension effect. The fluidity of our molten glasses permits the formation of true spheres during the available time interval. The beads should be homogeneous and have a nearly perfect sphericity in order to function properly as sphere-lenses.

Our invention provides high-index transparent glass beads of high quality which can be used as the spherelens optical elements in the type of reflex reflectors described in U. S. Patent No. 2,407,680 (Sept. 17, 1946). Such reflex reflectors have a layer of small transparent glass beads overlying or embedded in a light-reflector surface or layer, and the glass bead layer is overcoated with a transparent coating having a flat front face. The characteristic of such a reflector in returning back a brilliant cone of light toward the source of an angularly incident beam of light depends upon a proper optical structure. The ratio of the refractive index of the spheres to that of the overlying coating is a critical factor and it should preferably have a value of at least 1.4 with 1.9 being the approximate optimum. The usual coatings have a refractive index in the neighborhood of 1.5. The glass beads should have a refractive index of at least 2.1, and the index should preferably be above 2.3.

This type of reflex reflector is employed in making outdoor highway and vehicle signs and markers which are exposed to sunlight over a period of many months. We have provided glass beads that are substantially non-solarizing, i. e., will not darken to an objectionable extent when exposed out of doors for extended periods.

We have provided glass elements which are not only transparent but which are substantially colorless. Some of the glass compositions have an appreciable yellowish tint but this is not objectionable for some uses. These glasses can be colored, if desired, by inclusion of suitable color-imparting metal compounds or other agents.

Thus our invention is of particular commercial importance in providing clear, transparent, non-solarizing glass beads having a refractive index of 2.1 and higher, adapted for use in the manufacture of reflex reflectors of the type described in said U. S. Patent No. 2,407,680. The glass beads employed for such use have a diameter of less than one millimeter (40 mils), and the preferred diameter range is 1 to 10 mils, although beads of less than 1 mil diameter can be used. It is of interest to note that a cubic foot will contain about two billion beads of 10 mils diameter, and about two trillion beads of 1 mil diameter. The beads can be made by fusing particles of glass cullet which are blown or dropped through a high temperature flame or a radiant heating zone to soften them sufficiently to form transparent spheres by the action of surface tension while moving through air, followed by rapid cooling to harden the spheres without devitrification. The cullet can be made by quenching a stream of molten glass in water. The beads can also be made directly from a batch of molten glass.

Fibers can be made by jet-blowing a stream of molten glass. Filaments can be drawn from molten glass through a die, followed by rapid cooling. Thin plates and flakes of glass can be made by casting a thin layer of molten glass on a cold steel surface. Many of our glasses have been tested in the form of thin plates and have been found to have dielectric constants of 30 or higher, indicating suitability for use as dielectric elements of capacitors, etc.

Small jewelry "gems" can be made from pieces of our glass. The high refractive index and high optical dispersion results in high surface sparkle and high internal light reflection and causes the brilliant glowing effect and play of color characteristic of diamonds.

The transparent glass elements of our invention, which have refractive indices of at least 2.1, are fundamentally characterized as to composition:

(A) By containing at least 75% by weight of metal oxides selected from the group consisting of bismuth oxide ($Bi_2O_3$), lead oxide (PbO), thallium oxide ($Tl_2O_3$), tungsten oxide ($WO_3$), tantalum oxide ($Ta_2O_5$), and cadmium oxide (CdO), at least two of these metal oxides being each present in the amount of at least 5%.

(B) By containing one or both of the two first-mentioned metal oxides ($Bi_2O_3$ and PbO), in a total amount of at least 40%;

(C) By the absence, or the use in only small amounts, of the strong glass-forming oxides: boric oxide ($B_2O_3$), silicon dioxide ($SiO_2$), phosphorous pentoxide ($P_2O_5$) and germanium oxide ($GeO_2$); the total amount of these oxides (when used) not exceeding 10% and preferably not exceeding 6%, and the amount of the first-mentioned oxide ($B_2O_3$) in no event exceeding 6% and preferably not exceeding 3%.

Our glasses are also characterized by the absence in substantial amounts of the oxides of metals of atomic numbers up to 20. Reference is made to the oxides of lithium, sodium and potassium (alkali metals), of beryllium, magnesium and calcium (alkaline earth metals), and of aluminum. While traces of these metal oxides can be tolerated (and are not excluded from our glasses), they should preferably be absent or restricted to a total thereof that is less than 1%, and in no event should they total more than 5%. Common glasses, in contrast, contain substantial or large proportions of metal oxides in this category.

The metal oxides mentioned in paragraph (A) had not previously been recognized as glass-forming oxides, i. e., as metal oxides which are individually capable of forming glasses when in a pure state or which are capable of imparting glass-forming ability to compositions which do not contain one or more recognized glass-forming ingredients. See the well-known review paper of W. H. Zachariasen, "Atomic Arrangement in Glass," published in the Journal of the American Chemical Society, vol. 54, page 3841 (1932). J. E. Stanworth in his book "Physical Properties of Glass," Oxford Press (1950), states on page 12 that: "It seems definite that $Ta_2O_5$ by itself does not form a glass." Further, that: "attempts by the author to prepare a glass from pure B. P. bismuth oxide have failed and it seems very doubtful whether this oxide can be classed as a glass former."

We made the surprising discovery that combinations of two or more of these metal oxides, even in the absence of other agents, can be made into glasses capable of forming thin transparent glass elements without devitrifying, and that useful transparent glass elements can be made in this way which have extraordinarily high refractive indices (2.1 and higher).

We also discovered that small amounts of the strong glass-forming oxides mentioned in paragraph (C) can be included without preventing the obtaining of refractive indices of 2.1 and higher, and that they have the desirable effect of increasing the vitreosity so that elements of increased thickness can be formed without devitrification. The optimum total proportion thereof is often in the range of about 0.5 to 2.5% by weight for glasses used in making reflex reflector beads as previously described. Thus these oxides are not included as essential ingredients but as modifying agents which can impart the desired improvement even in trace amounts. It is of critical importance that the boric oxide ($B_2O_3$) must not be present in amount greater than 6% and that the total aggregate amount of these oxides not exceed 10%. Otherwise there will be a shift to a different type of glass having distinctively different properties and not useful for our purposes. Among other things, increase in the proportion of these oxides reduces the refractive index of the glass, and increases the viscosity of the glass melt.

Other oxides which can be added in small amounts, consistent with the above-mentioned primary requirements as to refractive index and composition, include the oxides of titanium, barium, zinc and vanadium. Oxides of elements such as chromium, nickel, iron, cobalt and manganese impart color to the glass and may be added in trace amounts, in the form of oxide or equivalent, where a colored product is desired. For transparent glass beads, a colorless glass is usually preferred, and such elements are therefore ordinarily excluded. Elements such as arsenic and antimony cause rapid solarization, i. e., a darkening or change of color on exposure of the glass to sunlight, and are avoided for most applications of our glass.

Substitution of halides for oxides, e. g. of $PbI_2$ for PbO, provides for a somewhat lower melting temperature of the glass and a reduction in viscosity, but such halides are ordinarily somewhat less stable at high temperatures than are the oxides, and they are more expensive.

Returning to the metal oxides listed above in paragraph (A), these are the oxides of the metals: bismuth, lead, thallium, tungsten, tantalum and cadmium. These metals have in common the fact that they are polyvalent heavy metals which appear in a limited region of the periodic table. The first five of these metals are in the limited atomic number range of 73 to 83, and they appear in the same horizontal series of the periodic table as shown, for example, on pages 58–59 of the sixth edition of Lange's Handbook of Chemistry. The sixth metal (cadmium) is diagonally adjacent to thallium in this table. They further have in common the recognized fact that they form stable oxides of high refractive index which are colorless or relatively colorless. The mentioned oxides of these metals are stable at glass-melting temperatures. These oxides are either colorless or have a yellowish or brownish tinge but impart little if any color to glasses even when added in large proportions. As previously mentioned, these metal oxides are not glass-formers per se, but we have discovered that they have the property of forming glasses, when used in combination together, which can be produced as thin transparent elements without devitrification.

While our glass compositions are reported in terms of oxide components in accordance with the general custom, it will be recognized that compounds other than oxides can be added in the original glass-making charge, in amounts calculated to provide the desired amount of oxide. For example, bismuth nitrate, lead nitrate or red lead, boric acid, barium carbonate and tungstic acid, added to the original batch, are sources of $Bi_2O_3$, PbO, $B_2O_3$, BaO and $WO_3$, respectively, in the finished glass. Thallium oxide, while preferably added as such, may be converted in the final glass to thallous oxide ($Tl_2O$), but in any event the composition of the glass is calculated on the basis of $Tl_2O_3$. In the subsequent formula examples, the amounts of materials used are calculated on the basis of the oxides shown, which are presumptively present in the glass. Analyses of several of the finished glass products have demonstrated that this basis is sufficiently accurate for all practical purposes.

Preferably, the glasses of this invention are melted in crucibles or pots which are not attacked by the glass and do not cause any change in the composition thereof. For most of the compositions, particularly where small batches are concerned, crucibles of silver have been successfully used. Unglazed porcelain crucibles have been used without significant change in glass composition. Best results have been obtained when using impervious aluminum oxide ($Al_2O_3$) crucibles. The ordinary clay pots employed in the glass industry are to be avoided, however, both because of the effect on the composition of the glass and also because our glasses, which are extremely fluid or even watery at the temperatures employed, show a tendency to soak into the relatively porous walls of such vessels.

A preferred type of our glass is comprised of at least 90% by weight of a plurality of metal oxides of the group: $Bi_2O_3$, PbO, $Tl_2O_3$, $WO_3$, $Ta_2O_5$ and CdO, and contains at least 40% of PbO and at least 5% of at least one other of these metal oxides; and preferably (but not necessarily) also contains at least one oxide of the group: $B_2O_3$, $SiO_2$, $P_2O_5$ and $GeO_2$, in a total amount not exceeding 10% and preferably not exceeding 6%, the amount of $B_2O_3$ (if used) not exceeding 6% and preferably not exceeding 3%.

A preferred bismuth-lead variety coming within the above specification is one containing 5 to 45% of $Bi_2O_3$ plus sufficient PbO to make the total of these two metal oxides at least 90% by weight of the glass, the glass being composed so as to have a refractive index above 2.3. The glass preferably contains at least one oxide of the group: $B_2O_3$, $SiO_2$, $P_2O_5$ and $GeO_2$, the total thereof not exceeding 10% and the amount of $B_2O_3$ not exceeding 3%. An illustrative species of such glass is composed of about 30 parts of $B_2O_3$, about 70 parts of PbO, and 0.5 to 2.5 parts of $B_2O_3$, by weight; having a refractive index above 2.3.

A preferred tungsten-lead variety coming within the above specification is one containing at least 40% of PbO and at least 10% of $WO_3$, the glass being composed so as to have a refractive index of at least 2.1. This glass preferably contains at least one oxide of the group: $B_2O_3$, $SiO_2$, $P_2O_5$ and $GeO_2$, the total thereof not exceeding 10% and the amount of $B_2O_3$ not exceeding 6%. An illustrative species of such glass is one composed of 75.2% of PbO, 20% of $WO_3$, 1.5% of $B_2O_3$ and 3.3% of $P_2O_5$; which forms nearly colorless glass beads having a refractive index of 2.25. A suitable batch formulation is 70.0% of red lead, 2.65% of boric acid, 21.6% of tungstic acid and 8.5% of lead metaphosphate.

Good results have been obtained with compositions containing 55 to 75% of PbO, 12 to 23% of $WO_3$, 1 to 3% of $B_2O_3$, 2 to 6% of $P_2O_5$, and 0 to 15% miscellaneous. $Bi_2O_3$, CdO, BaO, $SiO_2$, $TiO_2$ and $Tl_2O_3$ are examples of oxides which have been employed as components of the miscellaneous group.

An example of a glass containing tantalum oxide is one composed of 50% of $Bi_2O_3$, 20% of PbO, 20% of $Ta_2O_5$, 6% of $B_2O_3$ and 4% of $SiO_2$; having a refractive index of 2.10.

The invention is further illustrated by the examples set forth in the following tables, showing exemplary glass compositions which have been used to make transparent glass beads, the refractive indices ($n_D$) being listed in the last column:

Table I

| No. | Percentage Composition by Weight | | | | | | | | Refractive Index |
|---|---|---|---|---|---|---|---|---|---|
| | $Bi_2O_3$ | PbO | $Tl_2O_3$ | $WO_3$ | $B_2O_3$ | $SiO_2$ | $P_2O_5$ | $GeO_2$ | |
| 1 | 45 | 55 | | | | | | | 2.65 |
| 2 | 70 | 30 | | | | | | | 2.67 |
| 3 | 15 | 25 | | 60 | | | | | 2.30 |
| 4 | 42.5 | 52.5 | | 5 | | | | | 2.51 |
| 5 | 20 | 20 | 60 | | | | | | 2.63 |
| 6 | 42.5 | 52.5 | | 5 | | | | | 2.67 |
| 7 | 5 | 92.5 | | | 2.5 | | | | 2.38 |
| 8 | 30 | 67.5 | | | | | | 2.5 | 2.53 |
| 9 | 30 | 69.5 | | | .5 | | | | 2.64 |
| 10 | 45 | 54.5 | | | | .5 | | | 2.64 |
| 11 | 70 | 29 | | | | | 1 | | 2.66 |
| 12 | 94 | 5 | | | 1 | | | | 2.50 |
| 13 | 45 | 52.5 | | | 1 | 1 | .5 | | 2.43 |
| 14 | 80 | 17.5 | | | 1.5 | 1 | | | 2.41 |
| 15 | 40 | 50 | | | 4 | 3 | 3 | | 2.22 |
| 16 | 40 | 50 | | | | 8 | 2 | | 2.20 |
| 17 | 20 | 54 | 10 | 10 | 6 | | | | 2.20 |
| 18 | 25.1 | 57.4 | | 12.5 | | 5 | | | 2.29 |
| 19 | 30 | 30 | 30 | | 6 | 2 | 2 | | 2.12 |
| 20 | 45 | 42.5 | 5 | 5 | 1 | 1 | .5 | | 2.27 |

Table II

| No. | Percentage Composition by Weight | | | | | | | Refractive Index |
|---|---|---|---|---|---|---|---|---|
| | $Bi_2O_3$ | PbO | CdO | $B_2O_3$ | $SiO_2$ | BaO | $TiO_2$ | |
| 21 | 29.1 | 66.2 | 3.9 | .8 | | | | 2.49 |
| 22 | 66.3 | 10.2 | | | 8.2 | 5.1 | 10.2 | 2.23 |
| 23 | 70 | 25 | 5 | | | | | 2.64 |
| 24 | 54 | | 40 | 6 | | | | 2.16 |
| 25 | 64 | | 30 | | 6 | | | 2.22 |

Having described various embodiments of our invention, for purposes of illustration rather than limitation, what we claim is as follows:

1. Transparent glass beads having a diameter not exceeding 10 mils, formed from glass having a refractive index of at least 2.1 and essentially consisting of a composition of inorganic oxides including at least two polyvalent heavy metal oxides, each present in the amount of at least 5% by weight, selected from the primary group consisting of $Bi_2O_3$, PbO, $Tl_2O_3$, $WO_3$, $Ta_2O_5$, and CdO, the selection including at least one member of the sub-group consisting of $Bi_2O_3$ and PbO, the total amount of said subgroup oxides in the glass being at least 40% by weight and the total amount of said primary group oxides in the glass being at least 75% by weight, and said glass being further characterized by 0 to 10% by weight of strong glassforming oxides selected from the group consisting of $B_2O_3$, $SiO_2$, $P_2O_5$, $GeO_2$, and mixtures thereof, the amount of $B_2O_3$ in the glass being 0 to 6% by weight.

2. Glass beads according to claim 1 wherein the glass contains at least one oxide selected from the group consisting of $B_2O_3$, $SiO_2$, $P_2O_5$ and $GeO_2$.

3. Glass beads according to claim 1 wherein the glass contains at least one oxide selected from the group consisting of $B_2O_3$, $SiO_2$, $P_2O_5$ and $GeO_2$, the total of these oxides being in the range of 0.5 to 2.5%.

4. Transparent glass beads having a diameter not exceeding 10 mils, formed from glass having a refractive index of at least 2.1 and essentially consisting of a composition of inorganic oxides including at least two polyvalent heavy metal oxides, each present in the amount of at least 5% by weight, selected from the primary group consisting of $Bi_2O_3$, PbO, $Tl_2O_3$, $WO_3$, $Ta_2O_5$, and CdO, the selection including the member PbO, the total amount of PbO in the glass being at least 40% by weight and the total amount of said primary group oxides in the glass being at least 90% by weight, and said composition also including at least one strong glassforming oxide selected from the group consisting of $B_2O_3$, $SiO_2$, $P_2O_5$ and $GeO_2$, the total of these strong glassforming oxides not exceeding 6% by weight.

5. Glass beads according to claim 4 wherein the glass contains $B_2O_3$ in an amount not exceeding 3%.

6. Transparent glass beads having a diameter not exceeding 10 mils, formed from glass which essentially consists of 5 to 45% of $Bi_2O_2$ and sufficient PbO to make the total of these two metal oxides at least 90% by weight of the glass, and which also contains at least one oxide selected from the group consisting of $B_2O_3$, $SiO_2$, $P_2O_5$ and $GeO_2$, the total of these oxides not exceeding 10% and the amount of $B_2O_3$ not exceeding 3%; the glass being composed so as to have a refractive index above 2.3.

7. Transparent glass beads having a diameter not exceeding 10 mils, formed from glass which consists substantially entirely of about 30 parts of $Bi_2O_3$, about 70 parts of PbO, and 0.5 to 2.5 parts of $B_2O_3$, by weight, and having a refractive index above 2.3.

8. Transparent glass beads having a diameter not exceeding 10 mils, formed from glass having a refractive index of at least 2.1 and essentially consisting of a composition of inorganic oxides including at least two polyvalent heavy metal oxides selected from the primary group consisting of $Bi_2O_3$, PbO, $Tl_2O_3$, $WO_3$, $Ta_2O_5$, and CdO, the selection including the member PbO in the amount of at least 40% by weight and the member $WO_3$ in the amount of at least 10% by weight, the total amount of said primary group oxides in the glass being at least 75% by weight, and said composition also including at least one strong glass-forming oxide selected from the group consisting of $B_2O_3$, $SiO_2$, $P_2O_5$ and $GeO_2$, the total of these strong glassforming oxides not exceeding 10% by weight and the amount of $B_2O_3$ not exceeding 6% by weight.

9. Transparent glass beads having a diameter not exceeding 10 mils, formed from glass having a refractive index of at least 2.1 and essentially consisting of a composition of inorganic oxides including at least two polyvalent heavy metal oxides selected from the primary group consisting of $Bi_2O_3$, PbO, $Tl_2O_3$, $WO_3$, $Ta_2O_5$, and CdO, the selection including the member PbO in the amount of between 55 and 75% by weight and the member $WO_3$ in the amount of between 12 and 23% by weight, the total amount of said primary group oxides in the glass being at least 75% by weight, and said composition also including at least one strong glassforming oxide selected from the group consisting of $B_2O_3$, $SiO_2$, $P_2O_5$ and $GeO_2$, the total of these strong glassforming oxides not exceeding 10% by weight and the amount of $B_2O_3$ not exceeding 6% by weight.

10. As a new article of manufacture, a transparent glass element having a thickness not exceeding two millimeters, formed from glass having a refractive index of at least 2.1 and essentially consisting of a composition of inorganic oxides including at least two polyvalent heavy metal oxides, each present in the amount of at least 5% by weight, selected from the primary group consisting of $Bi_2O_3$, PbO, $Tl_2O_3$, $WO_3$, $Ta_2O_5$, and CdO, the selection including at least one member of the sub-group consisting of $Bi_2O_3$ and PbO, the total amount of said sub-group oxides in the glass being at least 40% by weight and the total amount of said primary group oxides in the glass being at least 75% by weight, and said glass being further characterized by 0 to 10% by weight of strong glassforming oxides selected from the group consisting of $B_2O_3$, $SiO_2$, $P_2O_5$, $GeO_2$, and mixtures thereof, the amount of $B_2O_3$ in the glass being from 0 to 6% by weight.

11. A glass element according to claim 10, which contains at least one oxide selected from the group consisting of $B_2O_3$, $SiO_2$, $P_2O_5$ and $GeO_2$.

12. A glass element according to claim 10, which contains at least one oxide selected from the group consisting of $B_2O_3$, $SiO_2$, $P_2O_5$ and GeO, the total of these oxides being in the range of 0.5 to 2.5%.

13. As a new article of manufacture, a transparent glass element having a thickness not exceeding two millimeters, formed from glass having a refractive index of at least 2.1 and essentially consisting of a composition of inorganic oxides including at least two polyvalent heavy metal oxides, each present in the amount of at least 5% by weight, selected from the primary group consisting of $Bi_2O_3$, PbO, $Tl_2O_3$, $WO_3$, $Ta_2O_5$, and CdO, the selection including the member PbO, the total amount of PbO in the glass being at least 40% by weight and the total amount of said primary group oxides in the glass being at least 90% by weight, and said composition also including at least one strong glassforming oxide selected from the group consisting of $B_2O_3$, $SiO_2$, $P_2O_5$ and $GeO_2$, the total of these strong glassforming oxides not exceeding 6% by weight.

14. A glass element according to claim 13, which contains $B_2O_3$ in an amount not exceeding 3%.

15. As a new article of manufacture, a transparent glass element having a thickness not exceeding two millimeters, which essentially consists of 5 to 45% of $Bi_2O_3$ and sufficient PbO to make the total of these two metal oxides at least 90% by weight of the glass, and which also contains at least one oxide selected from the group consisting of $B_2O_3$, $SiO_2$, $P_2O_5$ and $GeO_2$, the total of these oxides not exceeding 10% and the amount of $B_2O_3$ not exceeding 3%; the glass being composed so as to have a refractive index above 2.3.

16. As a new article of manufacture, a transparent glass element having a thickness not exceeding two millimeters, consisting substantially entirely of about 30 parts of $Bi_2O_3$, about 70 parts of PbO, and 0.5 to 2.5 parts of $B_2O_3$, by weight, and having a refractive index above 2.3.

17. As a new article of manufacture, a transparent glass element having a thickness not exceeding two millimeters, formed from glass having a refractive index of at least 2.1 and essentially consisting of a composition of inorganic oxides including at least two polyvalent heavy metal oxides selected from the primary group consisting of $Bi_2O_3$, PbO, $Tl_2O_3$, $WO_3$, $Ta_2O_5$, and CdO, the selection including the member PbO in the amount of at least 40% by weight and the member $WO_3$ in the amount of at least 10% by weight, the total amount of said primary group oxides in the glass being at least 75% by weight, and said composition also including at least one strong glassforming oxide selected from the group consisting of $B_2O_3$, $SiO_2$, $P_2O_5$ and $GeO_2$, the total of these strong glassforming oxides not exceeding 10% by weight and the amount of $B_2O_3$ not exceeding 6% by weight.

18. As a new article of manufacture, a transparent glass element having a thickness not exceeding two millimeters, formed from glass having a refractive index of at least 2.1 and essentially consisting of a composition of inorganic oxides including at least two polyvalent heavy metal oxides selected from the primary group consisting of $Bi_2O_3$, PbO, $Tl_2O_3$, $WO_3$, $Ta_2O_5$, and CdO, the selection including the member PbO in the amount of between 55 and 75% by weight and the member $WO_3$ in the amount of between 12 and 23% by weight, the total amount of said primary group oxides in the glass being at least 75% by weight, and said composition also including at least one strong glassforming oxide selected from the group consisting of $B_2O_3$, $SiO_2$, $P_2O_5$ and $GeO_2$, the total of these strong glassforming oxides not exceeding 10% by weight and the amount of $B_2O_3$ not exceeding 6% by weight.

References Cited in the file of this patent
UNITED STATES PATENTS 2,477,649    Pincus _____ Aug. 2, 1949